United States Patent

Benoit et al.

[11] Patent Number: 5,365,042
[45] Date of Patent: Nov. 15, 1994

[54] INSTALLATION AND METHOD FOR HEAT TREATING PARTS MADE OF A COMPOSITE MATERIAL HAVING A CERAMIC MATRIX BY USING MICROWAVE ENERGY

[75] Inventors: Joël M. D. Benoit, Cesson La Foret; Gilles J. M. Bessenay, Paris; Daniel G. Girault, Melun, all of France

[73] Assignee: Societe Nationale d'Etude et de Construction de Moteurs d'Aviation "S.N.E.C.M.A.", Paris, France

[21] Appl. No.: 848,246

[22] Filed: Mar. 9, 1992

[30] Foreign Application Priority Data

Mar. 14, 1991 [FR] France .................. 91 03065

[51] Int. Cl.$^5$ .................. H05B 6/80; C04B 35/64
[52] U.S. Cl. .................. 219/686; 219/696; 219/750; 219/762; 219/752; 219/711; 419/49; 425/174.8 E; 264/26
[58] Field of Search ........... 219/10.55 M, 10.55 R, 219/10.55 A, 10.55 B, 10.55 F, 679, 752, 686, 696, 750, 756, 762, 711, 710; 264/25, 26, 27; 425/174, 174.6, 174.8 R, 174.8 E; 419/48, 49, 57

[56] References Cited

U.S. PATENT DOCUMENTS

| | | | |
|---|---|---|---|
| 3,639,132 | 2/1972 | Egerton et al. | 264/332 |
| 3,715,555 | 2/1973 | Johnson | 219/10.55 A |
| 3,853,973 | 12/1974 | Hardtl et al. | 264/65 |
| 4,259,561 | 3/1981 | Roussy et al. | 219/10.55 A |
| 4,456,806 | 6/1984 | Arimatsu | 219/10.55 B |
| 4,714,812 | 12/1987 | Haagensen et al. | 219/10.55 A |
| 4,938,673 | 7/1990 | Adrian | 419/23 |
| 4,940,865 | 7/1990 | Johnson et al. | 219/10.55 A |
| 4,963,709 | 10/1990 | Kimrey, Jr. | 219/10.55 M |
| 5,010,220 | 4/1991 | Apte et al. | 219/10.55 M |
| 5,250,773 | 10/1993 | Lind et al. | 219/10.55 A |

FOREIGN PATENT DOCUMENTS

| | | |
|---|---|---|
| 0329338 | 8/1989 | European Pat. Off. |
| 2390025 | 12/1978 | France |
| 2423875 | 11/1979 | France |
| 2523797 | 9/1985 | France |
| 2606577 | 5/1988 | France |

OTHER PUBLICATIONS

World Patent Index Latest, Derwent Publications Ltd., London, GB; AN 85-319350; & JP-A-60 221 367 (Nippon Microwave KK) Nov. 6, 1985, "Sintered Ceramic Production".

*Primary Examiner*—Philip H. Leung
*Attorney, Agent, or Firm*—Oblon, Spivak, McClelland, Maier & Neustadt

[57] ABSTRACT

A heat treatment installation for parts made of a composite material having a ceramic matrix and including a treatment enclosure which is connected to a microwave generator by a waveguide and which includes a press for hot pressing a part to be treated in the enclosure and a gas source for introducing a protective gas into the enclosure.

5 Claims, 1 Drawing Sheet

INSTALLATION AND METHOD FOR HEAT TREATING PARTS MADE OF A COMPOSITE MATERIAL HAVING A CERAMIC MATRIX BY USING MICROWAVE ENERGY

BACKGROUND OF THE INVENTION

1. Field of the Invention

The present invention relates to a heat treatment installation comprising UHF or microwave heating means for the processing of parts made of a composite material with a ceramic matrix. The invention also relates to the treatment of such parts using the installation.

2. Discussion of the Background

As used herein, UHF waves, or microwaves, are Hertzian waves with frequencies below 300 GHz, a standard frequency currently used being 2.45 GHz.

The advantages obtained by the use of microwave heating in various applications are well known, namely:
 absence of thermal inertia, since the release of heat is restricted to the time for which the radiation source is in operation;
 direct heating inside the articles to be heated without affecting the environment (i.e. the enclosure or gas atmosphere around the article) and without overheating the surfaces;
 improvement of heating homogeneity for a homogeneous product and the possibility of selective heating in the case of a heterogeneous product.

Known installations for carrying out heat treatments using microwaves as the heating means generally comprise a radiation source or UHF wave generator which converts the electrical energy of the power supply into microwave energy, the generator usually being of the magnetron type, a treatment enclosure, an adaptor situated between the generator and the enclosure which acts as an impedance transformer for ensuring a satisfactory output, and waveguides connecting the different parts.

Examples of such arrangements are disclosed, in particular, in FR-A-2 390 025, FR-A-2 423 875, FR-A-2 523 797 and FR-A-2 606 577, which describe various applications for using the apparatus.

However, no fully satisfactory solution has been proposed for the production of parts made of a composite material having a ceramic matrix calling for, in particular, treatment cycles at high temperatures, especially in excess of 1000° C. Such requirements are met particularly in the production of parts intended for aeroengines.

SUMMARY OF THE INVENTION

To this end, according to the invention there is provided a heat treatment installation for parts made of a composite material with a ceramic matrix, comprising
 a treatment enclosure,
 a UHF or microwave generator,
 a waveguide for conducting waves generated by said generator into said treatment enclosure,
 a die in said treatment enclosure for receiving a part to be treated,
 means for single-axis hot pressing said part placed in said die in said enclosure, and
 means for introducing a neutral gas, such as argon, into said treatment enclosure for protecting said part during treatment.

Preferably, the enclosure forms a resonant cavity with respect to the generated microwave field, its shape being parallelepipedic of dimensions $a \times b \times L$ in a tri-rectangular reference frame $O,x,y,z$. The enclosure may include a movable wall forming a tuning piston for the resonant cavity.

The invention also provides a method of heat treating a part made of a composite material with a ceramic matrix using the said heat treatment installation of the invention, the method comprising the following steps:
 setting up the part to be treated on a support inside the treatment enclosure, setting up heat protection screens around the part, and closing the enclosure;
 introducing a protective inert gas into the enclosure;
 operating the microwave generator to microwave heat the part to a temperature above 1000° C., the temperature being selected according to the material forming the part;
 simultaneously operating the single-axis pressing means integrated with the enclosure to press the heated part;
 stopping the heating;
 releasing and removing the part from the enclosure.

Other features and advantages of the invention will become apparent from the following description of a preferred embodiment of a heat treatment installation in accordance with the invention, and its operation, with reference to the accompanying drawings.

DESCRIPTION OF THE PREFERRED EMBODIMENT

Figure 1:
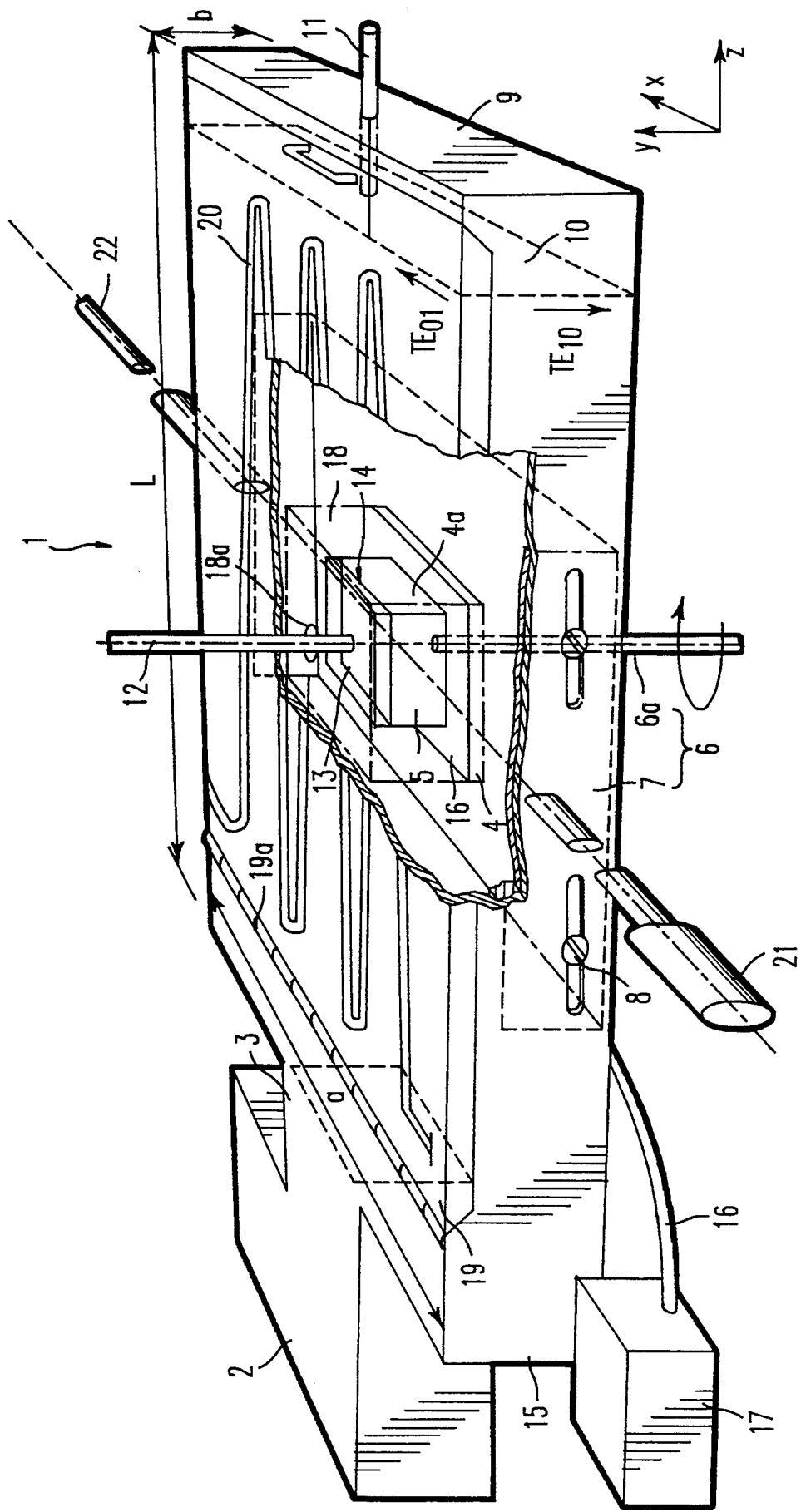
FIG. 1 is a diagrammatic, partially cut away, perspective view of one embodiment of a heat treatment installation in accordance with the invention.

The heat treatment installation shown in FIG. 1 is intended for use in the production of parts made of a composite material having a ceramic matrix, especially a glass matrix, and comprises an enclosure 1 of generally parallelepipedic shape, a UHF or microwave generator 2, and a waveguide 3 connecting the generator 2 to the enclosure 1. The inner dimensions of the treatment enclosure 1 are denoted a,b and L in a tri-rectangular reference frame $O,x,y,z$. In operation of the installation according to the invention, it will generally be desired to propagate the microwave energy in the $TE_{01}$ mode wherein the electric field E is constant and parallel to the direction Ox. However, the invention does not rule out operation in which the stabilized mode is of the $TE_{10}$ type for which the electric field is parallel to the direction Oy.

The treatment enclosure 1 has a support 4 for the part 5 which is to be made. The support 4 is made of a heat-insulating material of low density and low dielectric losses, a suitable material being a fibrous material in a zirconia or silica based matrix. The support 4 is associated with a mechanism 6 which is capable of either rotating the support 4 by means of a shaft 6a, or of moving it linearly inside the enclosure, especially in the direction Oz perpendicular to the electric field of the microwaves, the mechanism 6 including a movable cradle 7 which can be locked in position by screws 8. In addition, at the end of the enclosure opposite the wave entry end, the wall 9 of the enclosure parallel to the electric field is lined with a wall 10 which is movable by means of a rod 11 to form a resonant cavity tuning piston. This arrangement permits setting of the enclosure in stabilized resonance conditions relative to the generator field.

In operation, after the initial tuning obtained by means of the piston, the support 4 carrying the part 5 may be moved linearly in the enclosure 1 by means of the cradle 7 to take into account the displacement of the standing waves as the coupling of the material of the part 5 progresses in order to hold the part 5 in the optimum coupling conditions, and particularly in the areas of the enclosure 1 where the electric field is at a maximum. The cradle 7 comprises electrically-conducting plates which are able to slide in the enclosure 1 while maintaining electric continuity so as to prevent microwave radiation leaks.

The part 5 is arranged on the support 4 in strong dies 4a, which are also made of a material which is non-coupling relative to the microwave fields, such as a fibrous material of zirconia or silica type.

On the upper face of the enclosure 1 there is mounted a uni-axial pressing device 12 having a die 13 which is able to press the part 5 mounted on the support 4 inside the enclosure 1. The material forming the pressing die 13 must be compatible with the material of the parts 5 to be treated in order to prevent any interaction under the treatment conditions and, in addition, any coupling with the microwave field must also be avoided. In this embodiment the pressing die 13 is made of fibrous material in a matrix of a material with small dielectric losses such as zirconia or silica, and has a densified portion in the area 14 which contacts the part 5 during the pressing.

A wall 15 of the enclosure 1 is provided with a tapping 16 which can be connected to an external source, shown diagrammatically at 17, for supplying an inert gas, such as argon, to the enclosure. This enables a protective neutral atmosphere to be obtained in the vicinity of the part 5 when treating parts having ceramic fibers sensitive to oxidation.

In addition, the support 4 for the part 5 is provided with thermal screens 18 for surrounding said part, the pressing die 13 being disposed inside the area defined by the said screens 18, and the screens having a passage 18a for the device 12. During microwave heating of the part 5 in the absence of such screens 18, heat radiation between the outer surface of the part 5 and the cold walls of the enclosure 1 would bring about a temperature gradient between the core of the part 5 and its outer surface which would be detrimental to the quality of the treated product. The material used for the screens 18 must therefore be a good reflector of heat radiation, and also must not exhibit coupling with the microwave field. An example of a material meeting these requirements is a low-density fibrous material in a matrix of a low dielectric loss material such as zirconia or silica.

Depending on the part 5 to be produced, the support 4 may be of rectangular or circular shape, and in all cases, the pressing die 13 and the screens 18 will have a corresponding shape.

The upper face of the enclosure 1 may be formed by a movable wall defining a cover which is pivotable around a hinge 19a so as to provide access to the enclosure 1, and which maintains perfect electrical continuity when the cover is closed and the apparatus is in operation.

The use of the heat treatment installation in the production of parts 5 made of ceramic composite material with a ceramic matrix involves reaching high temperatures, particularly in excess of 1000° C. These operating conditions create risks of localized overheating, bringing about expansions detrimental to the operational stability of the enclosure 1. To eliminate this danger the cover 19 is provided with a cooling system. This system preferably includes a tube 20 welded on the cover 19 through which a cooling water flow can be set up. In the case where the metal cover 19 is of stainless steel, the tube 20 may be made of a copper alloy.

The supervising and monitoring of the treatments carried out in the enclosure 1 involves checking the temperatures reached by the material of the part 5 being treated. To this end, use may be made of a known device of the two-color optical pyrometer type, diagrammatically shown at 21, for measuring the surface temperature of the part 5, and an optical fiber thermocouple, which may be silica-based and is shown diagrammatically at 22, for measuring the temperature at the core of the part 5.

The heat treatment installation which has been described with reference to FIG. 1 is particularly useful for carrying out homogeneous microwave heating of a product made of a ceramic composite material with a ceramic matrix in the form of a layer or sheet. The product is placed in the enclosure 1, which forms a large sized resonant cavity, and is uni-axially pressed while being heated simultaneously in a microwave field to obtain a ceramic product having a ceramic matrix, particularly of glass or glass-ceramic type, reinforced with long or short fibers.

The dimensions a and b of the enclosure 1 are preferably in a ratio such that a/b is greater than four. The value of the dimension b of the enclosure 1 may be arranged so as to distribute the antinodes of the resonant wave in the longitudinal direction of the said enclosure 1, parallel to the direction Oz, in a particular manner. In particular said dimension b may be selected close to the value $c/2f$, where c is the speed of light in vacuo, and f is the frequency of the UHF wave used. For example, a standard frequency of 2.45 GHz may be used. Obviously, numerous modifications and variations of the present invention are possible in light of the above teachings. It is therefore to be understood that within the scope of the appended claims, the invention may be practiced otherwise than as specifically described herein.

We claim:

1. A heat treatment installation for parts made of a composite material with a ceramic matrix, comprising:
   a treatment enclosure,
   a UHF or microwave generator for generating an electric field,
   a waveguide interconnecting said enclosure with said generator for conducting waves generated by said generator into said treatment enclosure,
   a die located in said treatment enclosure for receiving a part to be treated,
   a single-axis pressing device for hot pressing said part placed in said die in said enclosure,
   a gas source in communication with said treatment enclosure for introducing an inert gas into said treatment enclosure for protecting said part during treatment; and
   a resonant cavity tuning piston mounted in said enclosure and which is movable towards and away from the waveguide so as to set the enclosure in stabilized resonance relative to the electric field generated by the generator, wherein said treatment enclosure includes a support for said die and said part placed therein, said support being made of a thermally insulating material, a rotary drive mechanism for rotating said support, and a device for linearly moving said support in a direction perpendicular to the direction of the electric field generated in said enclosure.

2. A heat treatment installation according to claim 1, wherein said die and said support are formed of a low-density fibrous material of zirconia or silica type having low dielectric losses.

3. A heat treatment installation according to claim 1, wherein said treatment enclosure includes heat screens for surrounding said die and said part to be treated.

4. A heat treatment installation according to claim 3, wherein said heat screens are formed of a low-density fibrous material of zirconia or silica type having low dielectric losses.

5. A heat treatment installation for parts made of a composite material with a ceramic matrix, comprising:
 a treatment enclosure,
  a UHF or microwave generator for generating an electric field,
  a waveguide interconnecting said enclosure with said generator for conducting waves generated by said generator into said treatment enclosure,
 a die located in said treatment enclosure for receiving a part to be treated,
 a single-axis pressing device for hot pressing said part placed in said die in said enclosure,
 a gas source in communication with said treatment enclosure for introducing an inert gas into said treatment enclosure for protecting said part during treatment;
 a resonant cavity tuning piston mounted in said enclosure and which is movable towards and away from the waveguide so as to set the enclosure in stabilized resonance relative to the electric field generated by the generator; and
 at least one optical fiber pyrometer for sensing the temperature at the surface of said part during treatment thereof, at least one silica-based optical fiber thermocouple for sensing the temperature at the core of said part, and a modulator for modulating the electric power of the microwaves acting on said part in said enclosure according to the temperatures sensed by said at least one pyrometer and said at least one thermocouple.

* * * * *